US007133909B2

(12) United States Patent
Bahl

(10) Patent No.: US 7,133,909 B2
(45) Date of Patent: Nov. 7, 2006

(54) SYSTEMS AND METHODS FOR LOCATING MOBILE COMPUTER USERS IN A WIRELESS NETWORK

(75) Inventor: Paramvir Bahl, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 09/760,180

(22) Filed: Jan. 12, 2001

(65) Prior Publication Data
US 2002/0095486 A1 Jul. 18, 2002

(51) Int. Cl.
*G06F 15/173* (2006.01)
*G06F 15/16* (2006.01)
*H04M 11/00* (2006.01)
*H04M 11/04* (2006.01)
*H04Q 7/20* (2006.01)

(52) U.S. Cl. .................... 709/223; 709/217; 455/403; 455/404.1; 455/456.1

(58) Field of Classification Search ............... 709/217, 709/223, 200; 455/403, 404.1, 456.1; 701/300
See application file for complete search history.

(56) References Cited

U.S. PATENT DOCUMENTS

| 5,163,004 | A | * | 11/1992 | Rentz ........................ 701/300 |
| 5,404,376 | A | * | 4/1995 | Dent ......................... 375/138 |
| 5,493,692 | A | * | 2/1996 | Theimer et al. ........... 455/26.1 |
| 5,508,707 | A | * | 4/1996 | LeBlanc et al. ......... 455/456.1 |
| 5,515,062 | A | * | 5/1996 | Maine et al. ............... 342/457 |
| 5,570,412 | A | * | 10/1996 | LeBlanc .................. 455/456.2 |
| 5,652,570 | A | * | 7/1997 | Lepkofker ............... 340/573.4 |
| 5,659,596 | A | * | 8/1997 | Dunn ....................... 455/456.1 |
| 5,666,662 | A | * | 9/1997 | Shibuya ................... 455/456.4 |
| 5,781,150 | A | * | 7/1998 | Norris .................... 342/357.08 |
| 5,917,425 | A | * | 6/1999 | Crimmins et al. ...... 340/825.49 |
| 5,919,239 | A | * | 7/1999 | Fraker et al. ................ 701/35 |
| 5,977,913 | A | * | 11/1999 | Christ ........................ 342/465 |
| 6,091,362 | A | * | 7/2000 | Stilp et al. ................... 342/465 |
| 6,167,274 | A | * | 12/2000 | Smith ...................... 455/456.3 |
| 6,259,991 | B1 | * | 7/2001 | Nysen ........................ 701/300 |
| 6,266,533 | B1 | * | 7/2001 | Zadeh et al. ............. 455/456.2 |
| 6,331,825 | B1 | * | 12/2001 | Ladner et al. .............. 340/988 |
| 6,512,478 | B1 | * | 1/2003 | Chien .................... 342/357.09 |
| 6,799,047 | B1 | * | 9/2004 | Bahl et al. ............... 455/456.1 |
| 6,839,560 | B1 | * | 1/2005 | Bahl et al. ............... 455/456.1 |
| 7,020,475 | B1 | * | 3/2006 | Bahl et al. ............... 455/456.1 |

* cited by examiner

*Primary Examiner*—Bharat Barot
*Assistant Examiner*—Kevin T Bates
(74) *Attorney, Agent, or Firm*—Lee & Hayes, PLLC

(57) ABSTRACT

System and methods for locating a computer user are described wherein the computer either periodically updates a network server with its location, or updates the network server when asked by the server to do so. The network server can be a mobile computer. The user's computer determines its physical location using a location tracker service and then transmits this location information to the server, which stores it in its memory. The information stored includes the physical location of the computer, the time when the location was identified, a name identifying the user of the computer, and an indicator, which indicates whether or not the user was active on the computer during a specified time interval prior to the transmission. The location of the user is deemed to be the last known location of the computer used by the user. If the user is logged onto more than one computer, the location of the user is deemed to be the last known location of the computer that indicates the user as being active.

18 Claims, 4 Drawing Sheets

SYSTEMS AND METHODS FOR LOCATING MOBILE COMPUTER USERS IN A WIRELESS NETWORK

TECHNICAL FIELD

This invention relates to locating users logged onto a network and, more particularly, to locating mobile users logged onto a wireless network.

BACKGROUND OF THE INVENTION

The proliferation of lightweight, portable computing devices and high-speed wireless local area networks (LANs) has enabled users to remain connected and be able to compute while on the move inside buildings and on campus areas around buildings. This new paradigm has given birth to a new class of applications that are "location aware." The goal of mobile computing in many instances is to enable a user to interact effectively with his or her physical surroundings. One example of such an interaction is to track physical locations of network users, particularly mobile users. Doing so allows one network user to query the network for a location of another network user and to receive a reasonably accurate response.

One component of these systems is the actual tracking system, which determines the user's location. The Global Positioning System (GPS) is one example of a technology, which enables the creation of inexpensive and portable systems that can help locate and track users. GPS systems currently are used to provide direction to drivers through an in-vehicle system; provide location and tracking information for marine navigation; and allow shipping companies to locate and track individual shipments. However, the GPS system relies on an unobstructed view of several satellites, making its use for tracking users who are indoors ineffective.

To overcome this obstacle, alternate technologies have been developed to locate and track users or objects in an indoor environment. One such system uses tags placed on the items that are to be tracked. In an electronic sense, the tags can be either active or passive, and they communicate with base stations. The base stations are physically linked together through a wired or wireless network. Each tag transmits a unique code to identify itself. The location of the tag can thereby be determined to be in the vicinity of the base station with which the tag last communicated.

Such tag-based tracking and location systems require a significant installation of specialized base stations. A tag-based system can only determine the location of the tags as being "near" a particular base station. As a result, a large number of base stations must be installed to achieve a sufficiently high resolution. Furthermore, obtrusive tags have to be placed on every item that is to be tracked or located, and in the case of infrared tags, the system operates only when there is a line of sight between the tag and a base station. For these reasons, tag-based systems have shown very limited success.

Another technology has been developed which uses radio frequency transmissions from base stations and mobile units to track the location of mobile units. This technology is described in U.S. patent application Ser. No. 09/513,155, entitled "Using a Derived Table of Signal Strength Data to Locate and Track a User In a Wireless Network, and in U.S. patent application Ser. No. 09/513,355, entitled "Locating and Tracking a User in a Wireless Network Through Environmentally Profiled Data."

In this system, a Wireless Local Area Network (WLAN) is utilized for locating and tracking users. A WLAN consists of base stations connected to a wired network, and mobile devices that are "connected" to the WLAN through radio frequency signals with the base stations. The signal sensing ability of both the base station and the mobile device are used to determine the location of the mobile device, and thus the location of the user of the mobile device. In particular, the strength of the signals received from several base stations is measured by the mobile device. The mobile device then compares the signal strength from each of the base stations to a pre-computed table containing the base stations' signal strength at various known locations of the mobile device. From this comparison, the mobile device determines its location. Alternatively, the signal strength from the mobile device can be measured at a number of base stations. This signal strength is then compared by a central computer to a pre-computed table containing the mobile computer's signal strength at the base stations for various known locations. From this table, the central computer determines the location of the mobile computer.

Although the mobile computer can identify its location using this system, a problem remains as to how one user, say User A, who is logged onto a network on a fixed or mobile computer can locate another mobile computer or, more likely, the person using the mobile computer, say User B. This problem has been solved for finding stationary users, since the requesting user, User A, can simply determine the location of a network access point to which the stationary user's, User B's, computer is connected and use that location to infer his or her location. But since, by definition, a mobile user can be physically located virtually anywhere within the coverage of the network, the problem becomes significantly more difficult to solve.

Yet another problem exists when one user is logged onto more than one computer in a network. Current systems and methods don't allow for distinguishing between the computers to identify where the user may be physically located.

SUMMARY OF THE INVENTION

Systems and methods are described that enable a network user to query the network for the location of another network user, particularly a mobile user. If the mobile user is logged onto more than one computer on the network, the requesting user can determine which of the computers the mobile user is currently using.

The mobile user periodically updates a local server database with the location coordinates of the mobile user and the time at which each update is received. A user name identifying the mobile user is associated with the location and time of update.

When another user wants to find the mobile user, the other user invokes a location manager to search a server database for a user name identifying the user. If the last update from the mobile user was made within a certain threshold of the query, the last known location stored on the server is immediately sent to the other user as the current location of the mobile user. This option requires very little overhead.

If the last update from the mobile user was made a while ago (i.e., outside the threshold), then the system invokes a location tracking service to determine the mobile user's location. By including periodic updates to the server, the user's computer enables the location manager to locate users using their computers even when they are not mobile and when they are not wirelessly connected.

The mobile computer is also configured to transmit an "active" signal if the mobile computer has been used within a specified time period. For example, if the mobile computer has been actively used within the two minutes prior to the latest update, the active signal is transmitted together with the location (and other) information. Therefore, when a user is logged onto multiple machines, it is possible to determine on which machine the user was most recently active. The location of the active machine is deemed to be the location of the user.

Additional features and advantages of the invention will be made apparent from the following detailed description of illustrative implementations, which proceeds with reference to the accompanying figures.

BRIEF DESCRIPTION OF THE DRAWINGS

A more complete understanding of the various methods and arrangements of the present invention may be had by reference to the following detailed description when taken in conjunction with the accompanying drawings, wherein.

DETAILED DESCRIPTION

Figure 1:
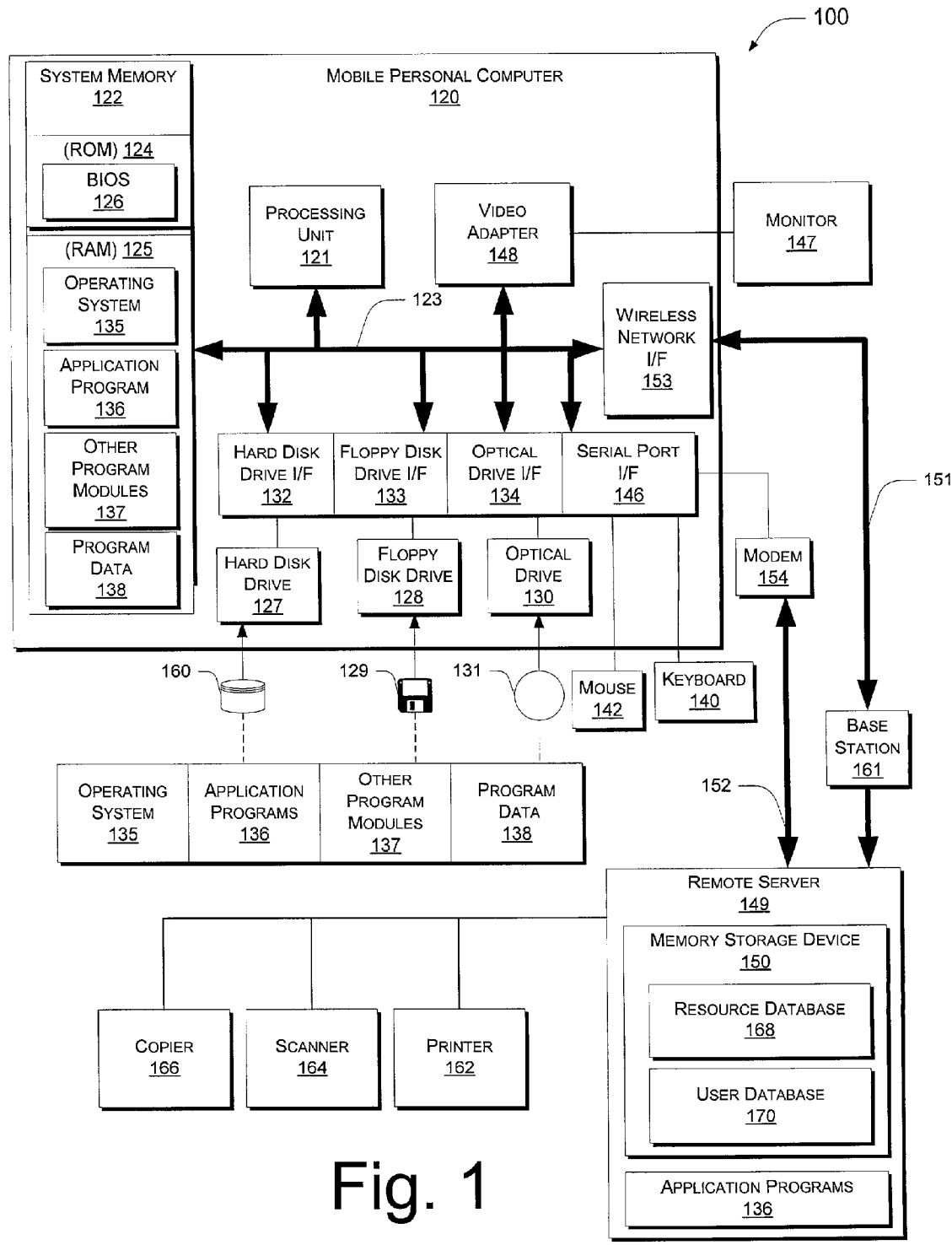
FIG. 1 is a block diagram generally illustrating an exemplary computer system on which the present invention resides.

The invention is illustrated in the drawings as being implemented in a suitable computing environment. Although not required, the invention will be described in the general context of computer-executable instructions, such as program modules, to be executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practice in distributed computing environments where tasks are performed by remote processing devices that are linked through a communications network. In a distributed computing environment, program modules may be located in both local and remote memory storage devices.

With reference to FIG. 1, an exemplary wireless network system 100 for implementing the invention includes a general purpose computing device in the form of a conventional mobile personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help to transfer information between elements within the mobile personal computer 120, such as during start-up, is stored in ROM 124. The mobile personal computer 120 further includes a hard disk drive 127 for reading from and writing to a hard disk 160, a floppy disk drive 128 for reading from or writing to a removable magnetic disk 129, and an optical disk drive 130 for reading from or writing to a removable optical disk 131 such as a CD ROM or other optical media.

The hard disk drive 127, floppy disk drive 128, and optical disk drive 130 are connected to the system bus 123 by a hard disk drive interface 132, a floppy disk drive interface 133, and an optical disk driver interface 134, respectively. The drives and their associated computer-readable media provide non-volatile storage of computer-readable instructions, data structures, program modules and other data for the mobile personal computer 120. Although the exemplary environment described herein employs a hard disk 160, a removable magnetic disk 129, and a removable optical disk 131, it will be appreciated by those skilled in the art that other types of computer-readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 160, magnetic disk 129, optical disk 131, ROM 124 or RAM 125, including an operating system 135, one or more application programs 136, other program modules 137, and a program data 138. A user may enter commands and information into the mobile personal computer 120 through input devices such as a keyboard 140 and a pointing device 142. Other input devices (not shown) may include a microphone, joystick, game pad, satellite dish, scanner, or the like. These and other input devices are often connected to the processing unit 21 through a serial port interface 146 that is coupled to the system bus, but may be connected by other interfaces, such a parallel port, game port or universal serial bus (USB). A monitor 147 or other type of display device is also connected to the system bus 123 via an interface, such as a video adapter 148. In addition to the monitor, personal computers typically include other peripheral output devices, not shown, such as speakers and printers.

The mobile personal computer 120 may operate in a networked environment using logical connections to one or more remote computers, such as a server 149. The remote server 149 may be another type of remote computer, such as another personal computer, a router, a network PC, a peer device or other common network node, and typically includes many or all of the elements described above relative to the mobile personal computer 120, although only a memory storage device 150 has been illustrated in FIG. 1. The logical connections depicted in FIG. 1 include a Wireless Local Area Network (WLAN) 151 and a wide area network (WAN) 152. Such networking environments are commonplace in offices, enterprise-wide computer networks, intranets and the Internet.

When used in a WLAN networking environment, the mobile personal computer 120 is connected to the local network 151 through a wireless network interface or adapter 153. The wireless interface 153 transmits packets wirelessly to a base station 161. The base station 161 can then retransmit the packets, either through a wired or wireless network to the remote server 149. When used in a WAN networking environment, the personal computer 120 typically includes a modem 154 or other means for establishing communications over the WAN 152. The modem 154, which may be internal or external, is connected to the system bus 123 via the serial port interface 146. In a networked environment, program modules depicted relative to the mobile personal computer 120, or portions thereof, may be stored in the remote memory storage device. It will be appreciated that the network connections shown are exemplary and other means of establishing a communications link between the computers may be used.

FIG. 1 also shows several fixed network resources, such as a printer 162, a scanner 164 and a copier 166. Information about the fixed resources 162, 164, 166 is contained in a resource database 168 stored in the memory storage device 150. Information contained included information regarding location of each fixed resource and properties of each fixed resource. It is noted that, while only a few fixed resources are shown, any number of fixed resources may be logically or directly connected to the remote server 149. Other resources are not necessarily connected to the remote server 149. Though not shown or discussed in the present example, other examples of fixed resources include an office, files, documents, e-mail addresses, databases, users, distributed components, and the like.

The memory storage device 150 also includes a user database 170 that stores information about users connected to the network 100. Such information includes, but is not limited to, user name, last known location, time of last location update and an activity indicator. This information will be discussed in greater detail below.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner will understood by those skilled in the art. The data structures where data is maintained are physical locations of the memory that have particular properties defined by the format of the data. However, while the invention is described in the foregoing context, it is not meant to be limiting as those of skill in the art will appreciate that various acts and operations described hereinafter may also be implemented in hardware.

Figure 2:
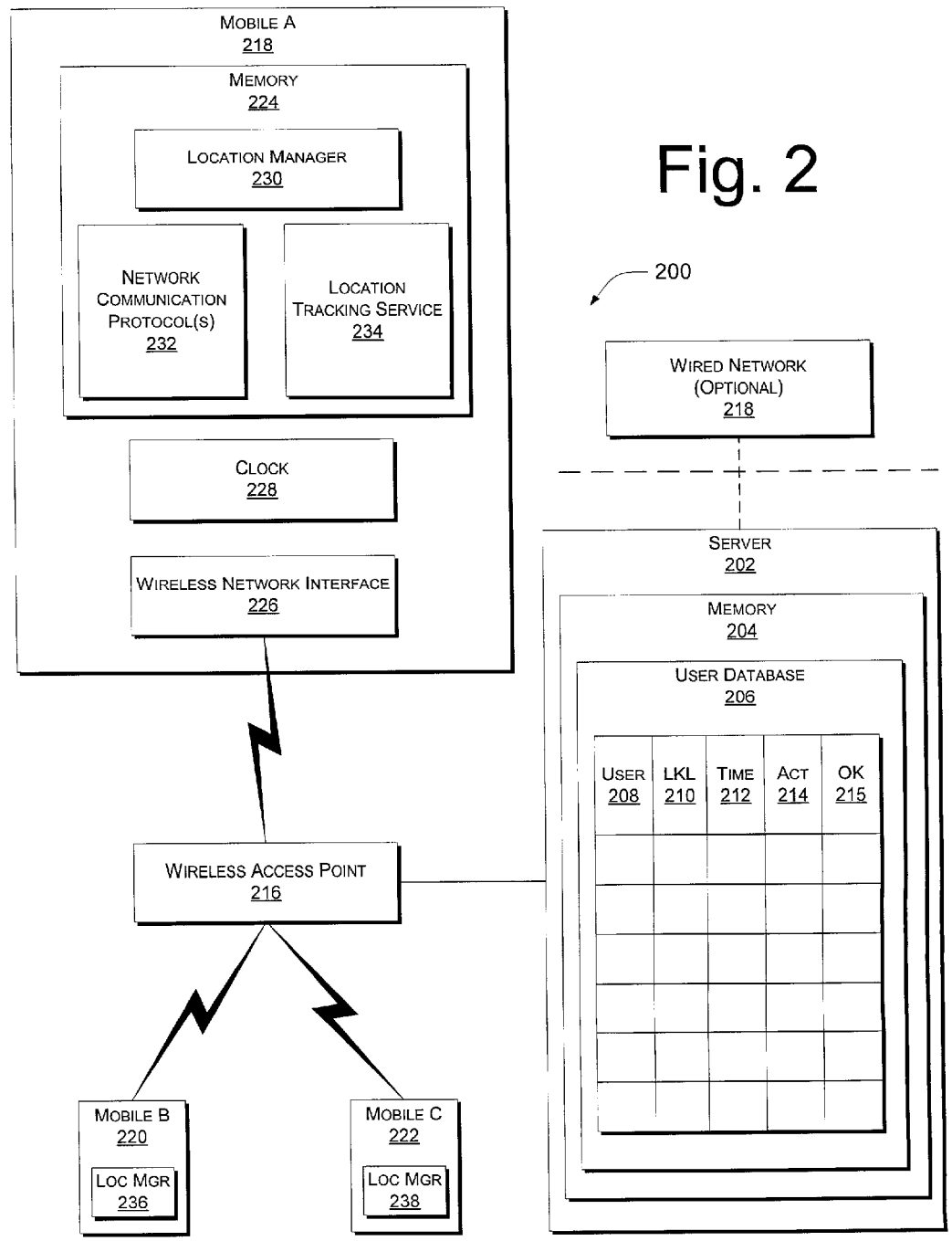
FIG. 2 is a block diagram of a wireless network system including a server and three mobile computers.

FIG. 2 depicts a wireless network system 200 similar to the system 100 shown in FIG. 1 but shown, in part, in greater detail. The wireless network system 200 includes a server 202 having memory 204 in which a user database 206 is stored. The user database 206 includes records having various fields. A user field 208 stores an identifier associated with a particular user of the system 200. Such an identifier is commonly referred to as a user name. A last known location field 210 stores a location of a computing unit determined and transmitted to the server 202 by the computing unit. The location stored in the last known location field 210 may be described in terms of absolute coordinates (latitude, longitude and/or altitude), coordinates relative to a known, fixed location (x meters, y meters from the front door of Building A), or a geographical unit (Room 2216, Conference Room A, etc.). Alternatively, the location may be the location of a network node, or access point, to which the computing unit is connected.

A time field 212 stores a time at which the last known location was transmitted. An active field 214 is included in the user database 206 and contains an indicator to indicate if the computing unit associated with a particular active field 214 was in use for a specific period of time prior to the transmission of the location information. For example, if a computing unit has not received any actuations by a user for, say, three minutes before a location update is transmitted to the server 202, a value of the active field 214 will indicate that the computing unit is not active. If, on the other hand, the computing unit was in use at the time the location update was transmitted to the server 202, the value of the active field 214 will indicate that the computing unit is active. The implications of the active field 214 and its indications will be discussed in greater detail, below.

The user database 206 also contains an OK field 215. The OK field 215 is is used to store a list of users that a user identified in the user field 208 has authorized to receive the identified user's location. Initially, the OK filed 215 is set to a default that allows any requesting user to find out where the identified user (the user identified in the user field 208) is located. However, the identified user may update the OK field 215 so that only those user authorized by the identified user can locate the identified user.

The server 202 is connected to a wireless access point 216. The wireless access point 216 may or may not be integrated into the server 202 itself. The wireless access point 216, as the name implies, serves as a reception point for wireless transmissions directed to the server 202. The server 202 may also be connected to a wired network 218, though this is not required if the network 200 is strictly for wireless users.

Several mobile computers are shown in communication with the wireless access point 216 of the network 200. Mobile A 218 is a mobile computer that is a part of the wireless network 200. Mobile B 220 and Mobile C 222 are, likewise, connected within the wireless network 200. It is noted that, although only three mobile computers are shown in FIG. 2, the wireless network 200 can comprise virtually any number of mobile computers, limited only by the physical constraints of the system.

Mobile A 218 includes memory 224 and a wireless network interface 226, which is used to communicate with the wireless access point 216 to access the wireless network 200. Mobile A 218 also includes a clock 228 that provides a time stamp for location transmissions from Mobile A 218. The memory 224 of Mobile A 218 stores a location manager 230, network communication protocol(s) 232 used by Mobile A 218 to communicate with the wireless network 200, and a location tracking service 234, which is configured to identify a location of Mobile A 218 upon request. Whenever the location manager 230 requires the location of Mobile A 218, it queries the location tracking service 234. The location tracking service 234 places the mobile's wireless network hardware in promiscuous receive mode so that it can receive beacons from all nearby base stations. Using the signal strength of the beacon packets with an appropriate, previously established radio map of the area or building, Mobile A 218 calculates its position. Alternatively, the location tracking service 234 in Mobile A 218 may simply query its wireless network interface 226 to determine the address of the wireless access point 216 to which it is connected. It may then either transmit this address to the server 202 which does a look up to determine the location of the wireless access point 216 or the Mobile A 218 may itself determine the location of the wireless access point 216 using a map of the area or building and transmit that location to the server 202. This location is then considered by the server 202 as the location of the Mobile A 218 and stored in the last known location 210 field.

In some implementations, it may be desirable to encrypt the location information before it is transmitted to the server 202. For instance, if a user of Mobile A 218 does not want users outside the system to determine the location of Mobile A 218, then the location data can be encrypted prior to transmitting the location data to the server 202. Also, a feature is described below, wherein a user of Mobile A 218 can identify users that are authorized to determine the location of Mobile A 218. In that case, it is important to encrypt the location information so only the authorized users can determine the location of Mobile A 218.

Although the location tracking service 234 is described as utilizing a radio frequency (RF) system that determines the location of Mobile A 218 by detecting RF signals transmitted from a number of base stations, it is noted that the location tracking service 234 may use any available method to identify the location of Mobile A 218, such as a GPS system, an IR-based system, a tag-based system, etc.

Mobile B 220 includes a location manager 236 and Mobile C 222 includes a location manager 238. Location manager 236 of Mobile B 220 and location manager 238 of Mobile C 222 are similar to location manager 230 of Mobile A 218, even though the only functionality described herein for location managers 236, 238 is a function that requests the location of Mobile A 218. These and other elements shown in FIG. 2 will be discussed in greater detail, below, with reference to FIG. 3 and FIG. 4.

Figure 3:
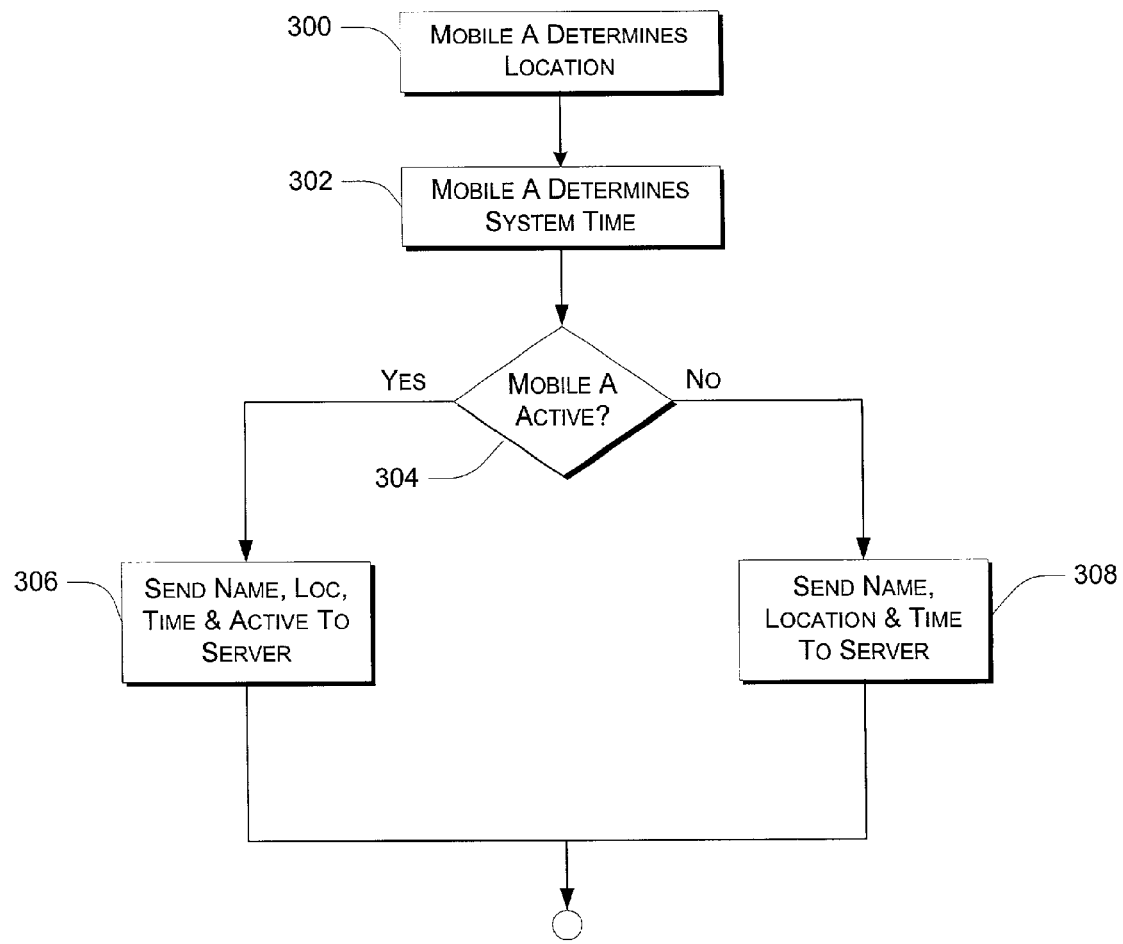
FIG. 3 is a flow diagram of client-side operations in a method for locating a mobile user within a wireless network.

FIG. 3 is a flow chart depicting client-side operations in a method for locating a mobile user in a wireless network. At block 300, Mobile A 218 determines its location from analysis of various radio frequency signal transmitted from known locations. The location may be determined in absolute (latitude, longitude, altitude) coordinates or in coordinates relative to a known absolute location (x meters, y meters from front door of Building A). If the wireless network system information is organized in a directory structure that associates a geographical region with each directory level (state, county, city, building, office, etc.), the location may be determined as a geographical unit, e.g., office 2216, Building A, etc. Such a geographically based information management system is Described in U.S. patent application Ser. No. 09/766,505, entitled "Information Management and Processing In a Wireless Network."

Mobile A 218 then determines a system time at step 302. This is accomplished by accessing the system time of the server 202 to which Mobile A 218 is connected.

At block 304, Mobile A 218 determines if a user has been active on Mobile A 218 for a specified time period prior to the location determination block 300. For instance, if the specified time period is two minutes, then Mobile A 218 is deemed to be active if a user operation has occurred in the two minutes prior to the determination block 300. If so ("Yes" branch, block 304), then a user name of a user on Mobile A 218, is transmitted to the server 202 together with the location coordinates, the time of the location determination, and an active signal indicating that Mobile A 218 is active (block 306). If the user has not operated Mobile A 218 during the specified time period ("No" branch, block 304), the active signal is not transmitted. In that case, only the user name, location coordinates and time of the location determination are transmitted to the server 202 at block 308. When the active signal is received at the server 202, the server 202 indicates in the user database 206 that Mobile A 218 is active. Contemporaneously therewith, the server 202 clears any other active signal that may be present for a computer used by the user logged onto Mobile A 218, since only one computer can be active for a user at any given time.

In an alternative implementation, Mobile A 218 does not periodically update its location with the server 202. This may be preferable in a situation where a user of Mobile A 218 wishes to conserve battery power or network bandwidth. In such an implementation, Mobile A 218 initially registers with the server 202 when Mobile A 218 becomes active. Thereafter, Mobile A 218 only updates its location when it receives a request to do so from the server 202. The server 202 makes such a request in the event that it receives a request from another user to locate Mobile A 218.

Figure 4:
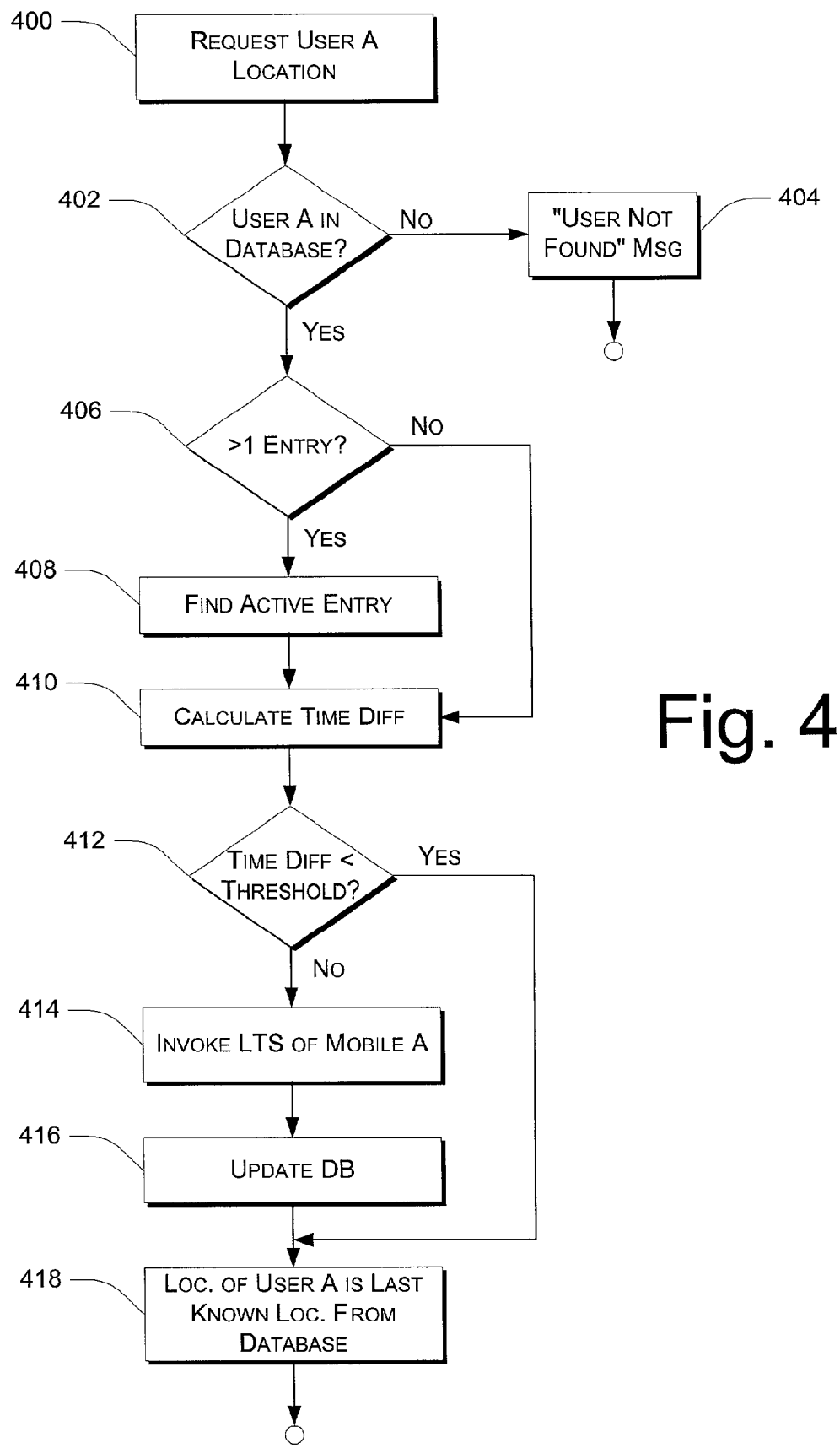
FIG. 4 is a flow diagram of server-side operations in a method for locating a mobile user within a wireless network.

FIG. 4 is a flow chart depicting server-side operations in a method for locating a mobile user in a wireless network. At block 400, the server 202 receives a request from a computing unit (such as Mobile B 220 or Mobile C 222) for a location of a specific user. For the present discussion, assume that Mobile C 222 submits a request to the server 202 for the location of "Victor," who is logged onto the network on Mobile A 218. Also assume that "Victor" is a unique user name. When the request for "Victor" is received, the server 202 searches for any entry in the user database 206 having "Victor" in the user field 208. If "Victor" is not found in the user database 206 ("No" branch, block 402), a "User Not Found" message is sent to Mobile C 222 at block 404.

If "Victor" is found in the user database 206 ("Yes" branch, block 402), then the server 202 continues to search the user field 208 of the user database 206 for other "Victor" entries at block 406. If at least one other "Victor" entry is found ("Yes" branch, block 406), the server locates the "Victor" entry that indicates an "active" status in the active field 214 (block 408). Block 408 is not performed if no other "Victor" entry is found.

At block 410, a time differential is calculated by finding the difference between the time of the last location update (time field 212) and a current time. The time differential is compared to a pre-defined threshold at block 412. If the time differential is within the threshold ("Yes" branch, block 412), then the location stored in the last known location field 210 of the user database 206 is deemed to be the location of "Victor," the user of Mobile A 218 (block 418). If the time differential is greater than the threshold ("No" branch, block 412), then a signal is transmitted to the location manager 230 of Mobile A 218 requesting a location update, which causes the location manager 230 to invoke the location tracking service 234 at block 414 to determine the current location of Mobile A 218. The current location information is then transmitted to the server 202 at block 416, where it is stored in the user database 206. Then, at block 418, the current location (which is now stored in the last known location field 210) is deemed to be the location of the user, "Victor."

It is noted that the systems and methods described herein may also be utilized to located fixed system users as well. In such a case, a location tracking service in a fixed computing resource can determine the address of its own network interface card and send that address to the network server. The network server can then look up the appropriate database to determine the name of the machine which contains this network card and its location. In this way, a user's location can be determined from the location of the computing resource, the user's name and the user's "active" status.

CONCLUSION

The described implementations advantageously provide for an effective way to locate a mobile user in a wireless network, even if the mobile user is logged into more than one computer. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:
    determining an absolute location of a mobile computing unit, wherein the act of determining the absolute location comprises receiving RF signals and a plurality of RF beacons having known locations and using environmental profiling to establish the absolute location of the mobile computing unit;
    periodically transmitting, from the mobile computing unit, the location of the mobile computing unit to a network server together with a user name of a user using the mobile computing unit; and
    including an active signal with the periodically transmitted information when the user is actively using the mobile computing unit.

2. The method as recited in claim 1, wherein the network server is a wireless network server.

3. The method as recited in claim 1, further comprising time-stamping the transmission to the network server and transmitting the time stamp with the transmitted information.

4. The method as recited in claim 1, wherein the user actively using the mobile computing unit further comprises the user having used the computing unit to within a predefined time period.

5. The method as recited in claim 1, wherein transmitting the absolute location of the mobile computer unit to a network server only occurs upon a request from the network server for the mobile computer unit to update the absolute location of the computer unit.

6. The method as recited in claim 1, further comprising encrypting the absolute location of the mobile computing unit prior to transmitting the absolute location of the computing unit to the network server.

7. A mobile computing unit, comprising:
    memory;
    a wireless network interface configured to connect the mobile computing unit to multiple wireless access points of one or more remote servers;
    a location tracking service configured to determine an absolute location of the mobile computer unit utilizing a radio frequency system capable of determining the absolute location by detecting signals transmitted from multiple wireless access points; and
    a location manager configured to periodically transmit the absolute location of the mobile computing unit to one or more of the remote servers via the wireless network interface.

8. The mobile computing unit as recited in claim 7, wherein the location manager is further configured to transmit a user name of a user logged onto the mobile computing unit to one or more of the remote servers together with the absolute location of the mobile computing unit.

9. The mobile computing unit as recited in claim 7, wherein the location manager is further configured to transmit an active signal to one or more of the remote servers together with the absolute location of the mobile computing unit when a user logged onto the mobile computing unit has actively used the unit within a specified period of time.

10. The mobile computing unit as recited in claim 7, further comprising a clock, and wherein the location manager is further configured to time-stamp the transmission of the location information with a time that the transmission is sent.

11. The mobile computing unit as recited in claim 7, wherein the location manager identifies and transmits the absolute location of a network node with which the mobile computing unit is communicating as the absolute location of the mobile computing unit.

12. The mobile computing unit as recited in claim 7, wherein the location manager is configured to invoke the location tracking service when commanded to do so by a second computing unit or one or more of the remote servers.

13. The mobile computing unit as recited in claim 7, wherein the location manager is further configured to encrypt the absolute location of the mobile computing unit before transmitting the absolute location of the mobile computing unit to one or more of the remote servers.

14. A method comprising:
    receiving radio frequency transmissions emitted from a plurality of radio frequency base stations of a wireless local area network;
    measuring relative strengths of the radio frequency transmissions;
    determining an absolute location of a mobile computing device based on the relative strengths;
    identifying the absolute location of the mobile computing device as that of a computer user;
    receiving a request for the absolute location of the computer user from a computing unit; and
    transmitting the absolute location of the computer user to the computing unit.

15. The method of claim 14, wherein the acts of receiving the radio frequency transmissions, measuring the relative strengths, and determining the absolute location are performed by the mobile computing device.

16. The method of claim 14, wherein the act of identifying the absolute location of the mobile computing device as that of the computer user comprises receiving from the mobile computing device an identifier associated with the computer user.

17. The method of claim 14, wherein the act of identifying the absolute location of the mobile computing device as that of the computer user comprises calculating a time differential between a time stamp associated with the absolute location of the mobile computing device and a current time, comparing the time differential with a predetermined time threshold, and defining the absolute location of the mobile computing device as that of the computer user if the time differential is less than the time threshold.

18. The method of claim 14, further comprising:
    receiving an active signal indicating that the computer user has actively used the mobile computing device within a specified period of time, and wherein the act of identifying the absolute location comprises defining the absolute location of the mobile computing device as that of the computer user if the active signal has been received within a predetermined period of time.

* * * * *